United States Patent [19]

Gates

[11] Patent Number: 5,299,314

[45] Date of Patent: Mar. 29, 1994

[54] NETWORK ADAPTER USING STATUS INLINES AND DATA LINES FOR BI-DIRECTIONALLY TRANSFERRING DATA BETWEEN LAN AND STANDARD P.C. PARALLEL PORT

[75] Inventor: Dirk I. Gates, Woodland Hills, Calif.

[73] Assignee: Xircom, Inc., Calabasas, Calif.

[21] Appl. No.: 117,990

[22] Filed: Sep. 8, 1993

Related U.S. Application Data

[63] Continuation of Ser. No. 497,341, Mar. 22, 1990, abandoned.

[51] Int. Cl.⁵ .............................................. G06F 3/00
[52] U.S. Cl. ........................... 395/200; 395/275; 395/800; 364/241.9; 364/239.9; 364/299.9; 364/283.3
[58] Field of Search ................. 395/200, 275, 800; 370/39

[56] References Cited

U.S. PATENT DOCUMENTS

| | | | |
|---|---|---|---|
| 4,417,320 | 11/1983 | Ei . | |
| 4,493,021 | 1/1985 | Agrawal et al. | 395/200 |
| 4,635,222 | 1/1987 | Tokui et al. | 395/114 |
| 4,672,570 | 6/1987 | Benken | 395/200 |
| 4,703,450 | 10/1987 | Sueyoshi et al. | 358/903 |
| 4,777,595 | 10/1988 | Strecker et al. | 395/200 |
| 4,812,847 | 3/1989 | Stewart et al. | 341/154 |
| 4,851,997 | 7/1989 | Tatara | 395/325 |
| 4,868,848 | 9/1989 | Magnusson et al. | 379/355 |
| 4,914,688 | 4/1990 | Kobayasi et al. | 379/93 |
| 4,958,342 | 9/1990 | Williams et al. | 370/79 |
| 4,969,083 | 11/1990 | Gates | 364/147 |
| 4,991,085 | 2/1991 | Pleva et al. . | |
| 5,092,791 | 3/1992 | Contarino | 439/365 |
| 5,113,497 | 5/1992 | Dewa | 395/275 |
| 5,119,020 | 6/1992 | Massey et al. | 324/158 |
| 5,133,055 | 7/1992 | Lieberman et al. | 395/275 |
| 5,187,645 | 2/1993 | Spalding et al. | 361/393 |

FOREIGN PATENT DOCUMENTS 2234093 1/1991 United Kingdom .

Primary Examiner—Parshotam S. Lall
Assistant Examiner—Krisna Lim
Attorney, Agent, or Firm—Freilich, Hornbaker & Rosen

[57] ABSTRACT

A network adapter configured to functionally connect a local area network cable to a personal computer bus via the computer's standard parallel port. The adapter includes a substantially fully enclosed housing having first and second external connectors respectively configured to mate with a computer's parallel port connector and with a network cable. The adapter is primarily comprised of (1) network interface circuitry for transmitting data packets to and receiving data packets from a local area network and (2) input/output circuitry for bidirectionally transferring data bytes between the network interface circuitry and a computer's parallel port.

30 Claims, 9 Drawing Sheets

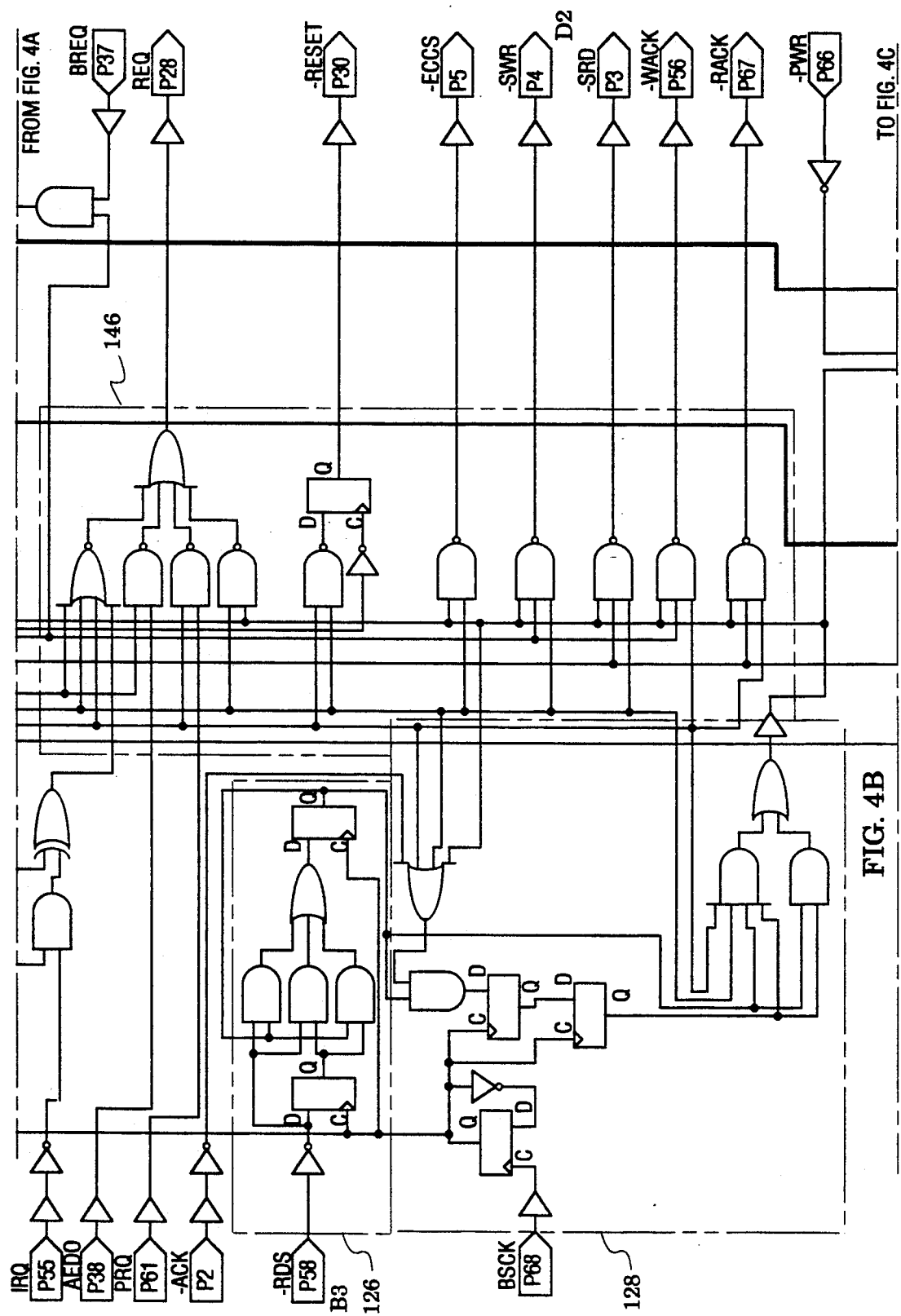

NETWORK ADAPTER USING STATUS INLINES AND DATA LINES FOR BI-DIRECTIONALLY TRANSFERRING DATA BETWEEN LAN AND STANDARD P.C. PARALLEL PORT

This is a continuation of application Ser. No. 07/497,341 filed on Mar. 22, 1990, now abandoned.

BACKGROUND OF THE INVENTION

The present invention relates to hardware/software systems of the type used to connect a personal computer (PC) to a local area network. Such systems are generally referred to as "network adapters", or more specifically by the particular network type with which the adapter is designed to function; e.g. Ethernet adapter, Token Ring adapter, etc.. Several such adapters are commercially available from different manufacturers. They are typically constructed around network specific chip sets supplied by integrated circuit manufacturers. For example, Intel, National Semiconductor, and Advanced Micro Devices each supply an Ethernet chip set.

In prior art network adapters, the chip set (typically comprised of controller, serial interface, and transceiver chips) is mounted on a circuit board configured for insertion into a spare expansion slot of the PC. When so inserted, the board edge connector automatically connects the chip set to the PC's data and address bus.

More specifically, an exemplary Ethernet chip set marketed by National Semiconductor consists of a Network Interface Controller (NIC) (DP8390), a Serial Network Interface (SNI) (DP8391 or DP83910) and a Coaxial Transceiver Interface (CTI) (DP8392). Working together, this three chip set implements the IEEE 802.3 network standard for connecting personal computers together in a local area network. The CTI chip is typically connected between the Ethernet coaxial cable and the SNI chip to alternatively drive, or receive packet data from, the coaxial cable. The SNI chip is connected between the CTI chip and the NIC chip and basically performs Manchester data encoding/decoding functions. The NIC is the heart of the three chip set and implements all Media Access Control (MAC) functions for transmission and reception of packets in accordance with the IEEE 802.3 standard. In typical prior art network adapters, the NIC connects directly to the PC bus via the aforementioned board edge connector.

SUMMARY OF THE INVENTION

The present invention is directed to a self contained network adapter configured with a housing designed to externally connect to a PC parallel port, rather than as a circuit board intended for insertion into a PC expansion slot.

Various generations of PC's have been widely commercially marketed over the last several years including at least the original IBM PC, the PC XT, the PC AT, and more recently the PC PS/2. Essentially equivalent personal computers have been marketed by many companies other than IBM and are typically referred to as IBM compatible PC's. Regardless of the manufacturer, such PC's are almost always provided with a 25-pin D shell output connector and associated electronics generally referred to as a parallel port. The basic function of the parallel port is to output data bytes (eight bits in parallel) and control signals to a peripheral device such as a printer. Different generations of PC's have been characterized by somewhat different control logic connecting the PC back plane to the parallel port connector. Thus, for example, the XT parallel port control logic is configured to provide eight unidirectional-out data lines, five unidirectional-out control lines and five unidirectional-in status lines. In the XT configuration, the unidirectional data lines emanate from a unidirectional-out data latch and are intended to be used solely for writing to a peripheral device and not for reading therefrom. The AT configuration differs from the XT primarily in that it additionally has an in data latch for reading data from the data lines. The PS/2 configuration differs further in that it includes a bidirectional data latch which is set to either read data in or write data out dependent upon the state of a control bit.

The present invention is directed to a network adapter capable of operating with different types of PC parallel ports.

In accordance with a preferred embodiment, the network adapter is primarily comprised of (1) network interface circuitry (e.g. the aforementioned National Semiconductor chip set) for transmitting data packets to and receiving data packets from a local area network and (2) input/output circuit means for bidirectionally transferring data bytes between the network interface circuitry and a PC parallel port.

In accordance with a further aspect of the preferred embodiment, the input/output means includes programmable control logic (e.g. programmable gate array) which is configured by data supplied to it by the PC to which the adapter is connected. The PC configures the control logic by executing a software device driver.

In accordance with a further aspect of the preferred embodiment, the device driver tests the adapter based on the assumption of one parallel port type (e.g. bidirectional). If that test fails, then the adapter is tested for a second parallel port type (i.e. unidirectional).

In accordance with a further feature of the invention, when a unidirectional parallel port type is determined, the adapter operates in a partial byte (preferably, double quasi nibble) transfer mode. In this mode, the adapter uses four of the parallel ports unidirectional-in status lines to transfer an eight bit data byte to the PC, four bits at a time.

In accordance with a still further aspect of the preferred embodiment, the input/output circuit means includes signal shaping means for enhancing the sharpness of signal level transitions from the parallel port to increase operating speed. The signal shaping means preferably includes buffer means for introducing hysteresis to smooth out perturbations and digital debouncing means for removing short duration spikes; e.g. less than 500 nanoseconds.

A preferred adapter in accordance with the present invention includes a housing (approximately 5" by 2.5" by 1") dimensioned to be conveniently carried by a user. A 25 pin D shell connector is mounted on one end of the housing for connection to a parallel port connector. A second connector (e.g. BNC "T" connector) is mounted on the opposite end of the housing for connection to a network media. DC power is supplied to the adapter via a small socket in the housing which receives an AC adapter plug.

Embodiments of the present invention are marketed by Xircom of Woodland Hills, Calif. as its Pocket LAN Adapter Various versions are available for different networks, i.e. Ethernet, Token Ring and Arcnet. The Xircom adapter was introduced in April 1989 at the Comtex trade show in Chicago. It has been widely reviewed in the press; e.g. InfoWorld, Jun. 12, 1989 in its column TECH TALK by Steve Gibson. Exemplary specifications follow:

Model PE10B2
Media Interface: Thin Ethernet and IEEE 802.8 10BASE-2 CSMA/CD
Includes BNC "T" Connector
Model PE10BX
Media Interface: Ethernet and IEEE 802.3 CSMA/CD Supports all external MAU physical layer configurations including Thick Ethernet (10BASE-5) and Twisted Pair Ethernet (10BASE-T)
All other specifications are common to both PE10B2 and PE10BX
Size: 5.15"×2.45"×0.85" overall including connectors
Weight: 5 oz.
Operating Temperature range: 0° C. to 50° C.
Storage Temperature range: −40° C. to 80° C.
Memory Size:
8K×8 Network Buffer
256 bit EEPROM Configuration Storage
Transfer Rate: 10 megabits per second
Diagnostics: Loopback self test capability
Software Supplied: Novell certified Netware drivers and 3Com 3+ drivers supplied on 3.5" and 5.25" diskettes
FCC Certification: Part 15, Subpart J, Class A.
AC Adapter:
Style: Wall mount
Input voltage: 100 VAC to 125 VAC
Output voltage: 12 VDC unregulated
Size: 2.6"×2.6"×2.2" overall including connector and cord exit
Cord length: 6'
Weight: 14 oz.

DETAILED DESCRIPTION

Figure 1B:
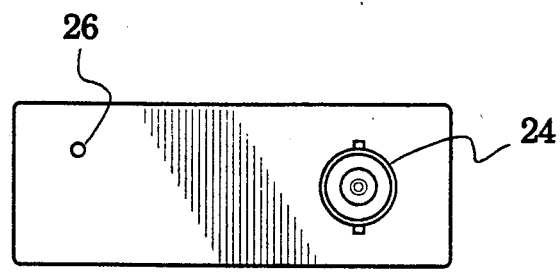
FIGS. 1A and 1B are respectively isometric and end views showing the housing of a preferred network adapter in accordance with the present invention.
Figure 1A:
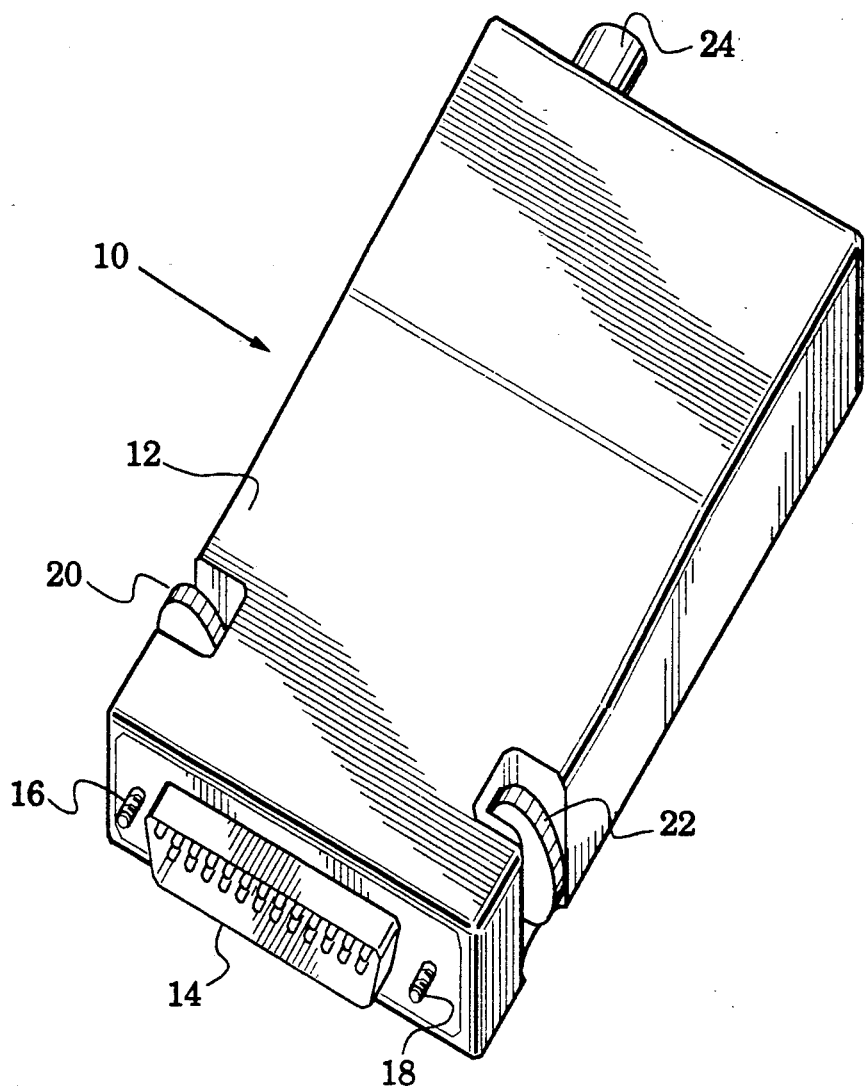

Attention is initially directed to FIGS. 1A and 1B which show the external configuration of a preferred embodiment of a network adapter 10 in accordance with the present invention. The adapter 10 is comprised of a substantially enclosed rectangular housing 12. A first connector 14 is mounted on one end of the housing 12 for mating connection to a standard PC parallel port D-shell connector. First and second captive screws 16 and 18 are mounted in the housing 12 for coupling to threaded holes typically provided adjacent a standard PC parallel port connector. Thumbwheels 20 and 22 are mounted for rotation within recesses in the housing 12 to enable a user to rotate the screws 16 and 18.

A second connector means 24 is mounted on the opposite end of the housing 12. The connector means 24 is configured to connect to a local area network media, e.g. coaxial cable as is used in standard Ethernet networks. The housing 12 additionally defines a socket 26 intended to receive a conventional AC adapter jack which supplies DC voltage (e.g. 12 volt D.C. unregulated).

The purpose of the adapter 10 is to enable personal computers, principally IBM and compatible PC's, to be readily connected to local area networks such as Ethernet, Thin Ethernet, Token Ring, Arcnet, etc.. Preferably, a network adapter embodiment in accordance with the present invention is especially configured to work with a specific network. Thus, it is deemed preferable that a family of different network adapters be provided in accordance with the invention, each intended to work with a different type of network. Unless otherwise stated, it will be assumed herein that the network adapter embodiment 10 depicted in FIGS. 1A and 1B is intended to work with a Thin Ethernet network using RG-58 coax, compatible with the depicted connector 24.

The rectangular housing 12 is preferably dimensioned to be substantially pocket sized so that it can be conveniently carried by a user. For example, the network adapter in accordance with the invention currently being manufactured by the assignee of the present application has a length equal to approximately 5 inches, a width equal to approximately 2½ inches, and a height equal to approximately 1 inch. The adapter 10 is intended to readily connect externally to any standard PC parallel port, thus eliminating the difficulty of internally installing prior art circuit board network adapters. The external configuration of applicant's network adapter 10, as depicted in FIGS. 1A and 1B, makes it particularly suitable for use with laptop computers and also for PC's in which the available slots, or power, are at a premium.

Figure 2:
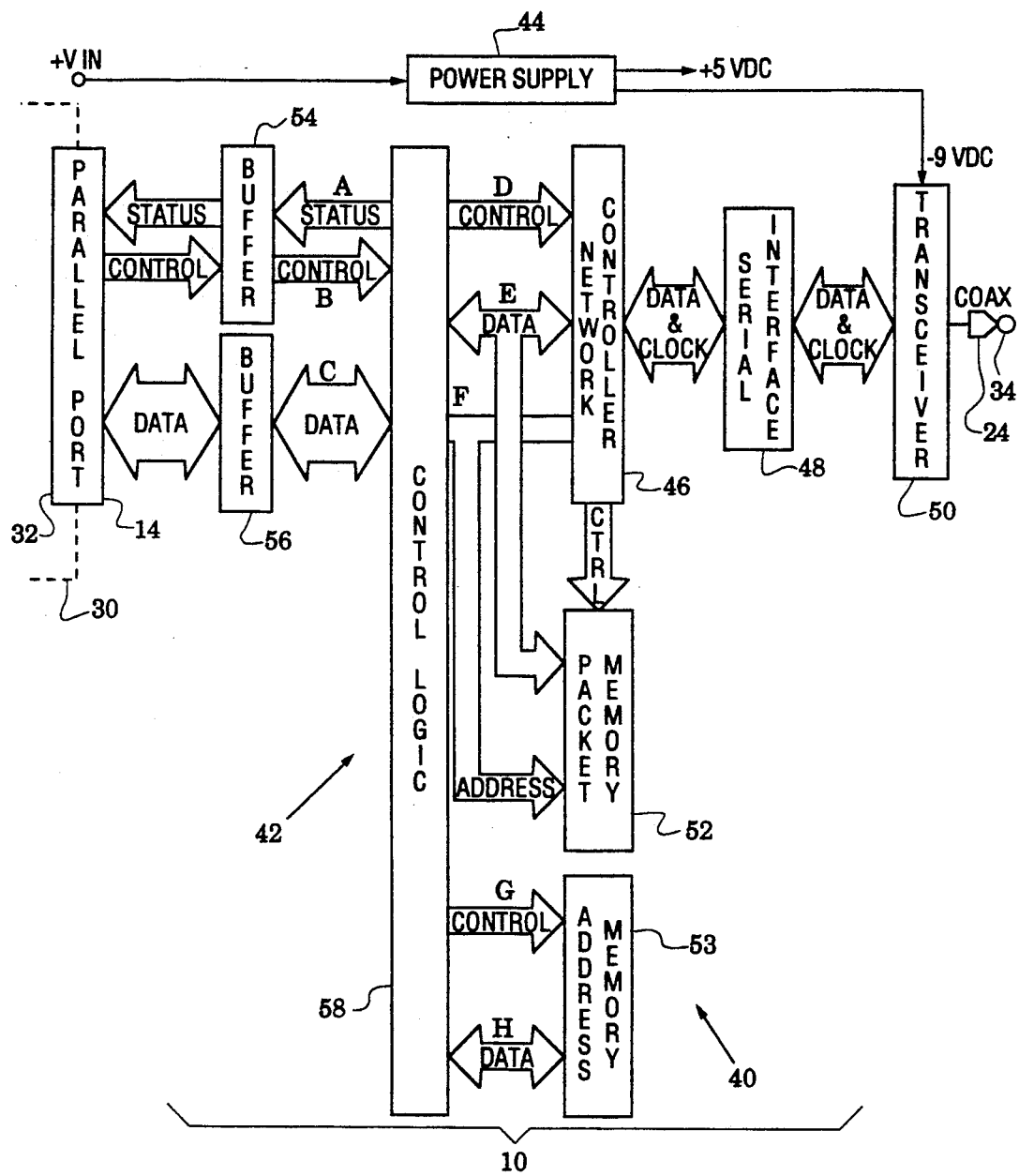
FIG. 2 comprises a functional block diagram of a preferred network adapter in accordance with the present invention.

Attention is now directed to FIG. 2 which comprises a block diagram of the network adapter 10 for functionally connecting a PC 30 via its parallel port 32 to a network media, e.g. coax, 34. As indicated, the network adapter connector 14 mates with the connector of the parallel port 32 (to be discussed further in connection with FIG. 3) and the connector 24 mates with the network media 34. The network adapter electronics, depicted in block form in FIG. 2, is carried by a circuit board (not shown) fully contained within the network adapter housing 12 (FIG. 1A). The electronics may appropriately be considered as being primarily comprised of three functional portions; i.e., a network interface portion 40, an input/output portion 42, and a power supply portion 44.

The network interface portion 40 is primarily comprised of a network interface controller 46, a serial network interface 48, and a transceiver interface 50. Devices 46, 48 and 50 are readily available as integrated circuit chips and are sold as chip sets by various semiconductor manufacturers. For example only, National Semiconductor markets an Ethernet chip set including a network interface controller DP8390, a serial network interface DP8391 or DP83910 and a coaxial transceiver interface DP8392. The network interface portion 40 further includes a data packet memory 52 and an address memory 53. The integrated operation of the devices 46, 48, 50, 52 and 53 is widely discussed in the prior art literature and is characteristic of the aforementioned circuit board type of network adapters which are accommodated in available PC slots.

The input/output circuit portion 42 is primarily comprised of buffers 54, 56 and control logic 58. Buffers 54 and 56 preferably comprise integrated circuits widely marketed as bus transceivers by various manufacturers, e.g. 74LS devices sold by Texas Instruments. In a network adapter in accordance with the invention, as depicted in FIG. 2, the hysteresis characteristics of the buffers 54 and 56 improve noise margins by smoothing the level transitions of the output signals supplied by the PC 30 at the parallel port 32. That is, the output signal level transitions delivered by a typical PC at its parallel output port 32 are fairly sloppy or irregular. The hysteresis function of the buffers 54 and serves to clean up or smooth out the perturbations in those level transitions or signal edges. As indicated, buffer 56 is bidirectional and is used to transfer data bytes (eight bits) between the connector 14 and the control logic 58. The buffer 54 is unidirectional, half (four bits) being used for input signals from connector 14 and the other half (four bits) being used for output signals to connector 14.

The control logic 58, to be discussed in greater detail in connection with FIG. 4, is preferably implemented in a programmable device (e.g. programmable gate array) so that a software device driver executed by the PC 30 will initialize or configure the control logic 58 each time it is booted up. This initialization or configuration procedure will be discussed hereinafter in connection with the flow chart of FIG. 5. Alternatively, the control logic 58 can be implemented in an application specific integrated circuit (ASIC).

Figure 3A:
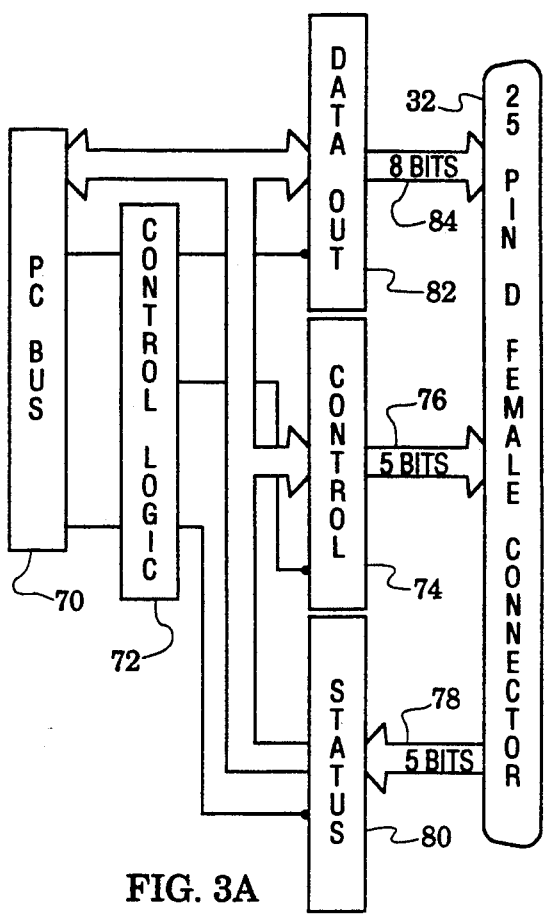
FIGS. 3A, 3B, and 3C comprise block diagrams respectively depicting the configuration of standard parallel ports for the XT, AT, and PS 2 generations of IBM compatible PC's.
Figure 3B:
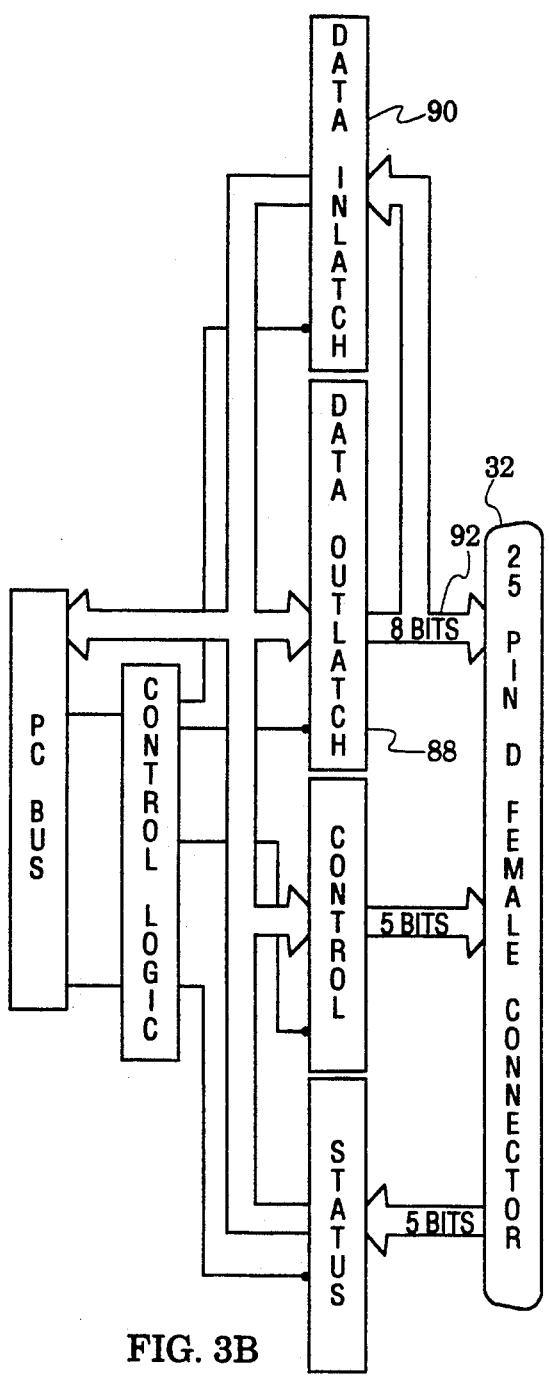
Figure 3C:
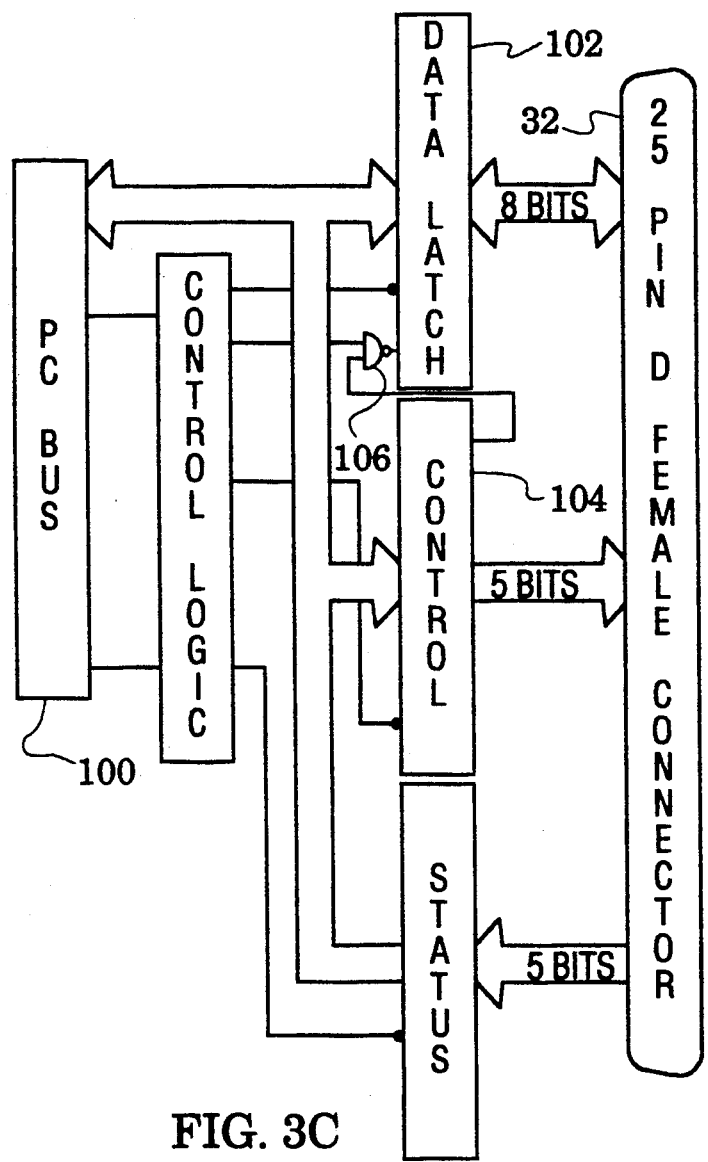

Before proceeding with a detailed explanation of the control logic 58 depicted in FIG. 4, attention is directed to FIGS. 3A, 3B and 3C which respectively illustrate standard parallel port configurations for the IBM XT, IBM AT, and IBM PS/2 PC's. Note that all three parallel port configurations utilize a standard twenty five pin female connector, previously identified as element 32 in FIG. 2. In the standard IBM XT configuration depicted in FIG. 3A, the PC bus 70 is internally connected through control logic 72 to a set of control latches 74. Five bit lines 76 connect the unidirectional out control latches 74 to pins on the connector 32. Five additional pins on the connector 32 connect via five status lines 78 to unidirectional in status latches 80 and then to the control logic 72. Most significantly in FIG. 3A, note that a set of eight unidirectional out data latches 82 connect the bus 70 through lines 84 to pins on the connector 32. The data latches 82 are unidirectional out to connector 32 and do not allow for reading data from the connector 32 back into the PC bus 70 via the data lines 84. As will be seen hereinafter, in accordance with the present invention, the five status lines 78 are used by the network adapter 10 for reading data in to the PC bus 70, four bits at a time. This data transfer mode will hereinafter sometimes be referred to as a double quasi nibble transfer mode.

The IBM AT parallel port configuration depicted in FIG. 3B differs from the XT configuration in that it includes eight data out-latches 88 and eight data in-latches 90 both connected to the eight data lines 92. The AT parallel port was designed only with data output capability in mind with a readback capability, i.e. via data in-latches 90, for detecting faults. The data out-latches 88 are not tristatable, i.e. they are always driving out. In operating with the AT configuration of FIG. 3B, the network adapter 10 is able to force the data out-latch 88 to all ones and is able to read data in, eight bits in parallel, via the data in-latch 90, because of its TTL implementation which allows a TTL ground to overcome a TTL high level. In summary, when properly driven, the AT parallel port inherently allows data bytes to move bidirectionally without any control of the bidirectionality.

In the PS/2 parallel port configuration depicted in FIG. 3C, the PC bus 100 is connected through a bidirectional data latch 102 to the parallel port connector 32. In this configuration, a bit within the control latch 104 controls the directionality of the data latch 102 via gate 106. A network adapter 10 in accordance with the present invention sets the bit in the control latch 104 to set the directionality of the data latch 102, that is to either transfer data into or out of the data latch 102 with respect to the connector 32.

Thus, in summary, a standard XT parallel port (FIG. 3A) is strictly unidirectional, standard AT parallel port (FIG. 3B) was designed to be unidirectional but as a consequence of it being able to detect faults, can be used in a bidirectional fashion, and a standard PS/2 parallel port (FIG. 3C), is truly bidirectional and its directionality is controlled by a control bit.

Note in FIG. 2 that the letters A–H have been applied to various groups of bitlines into and out of the control logic 58. These designating letters have been introduced in FIG. 2 to help key various lines to the detailed control logic schematic of FIG. 4. Thus, the letter A in FIG. 2 has been used to identify four status lines out of control logic 58 which connect via the buffer 54 to the parallel port status lines. The status lines A are used in accordance with the present invention in the double quasi nibble transfer mode to transfer four data bits at a time to the parallel port.

The letter B in FIG. 2 identifies control lines coming into the control logic 58 from the buffer 54, specifically including a register address strobe, a read/write signal, and a register data strobe.

The letter C in FIG. 2 designates the eight bidirectional data lines coupling buffer 56 to control logic 58.

The letter D in FIG. 2 identifies control lines used for control signals from the control logic 58 to the network controller 46. The letter E identifies eight lines used to transfer data bytes bidirectionally between the control logic 58 and the network controller 46. The letter F in FIG. 2 identifies address lines for addressing the packet memory 52.

The letter G identifies control lines from control logic 58 to the address memory 54, preferably an electrically erasable read only memory. The letter H identifies bidirectional data lines between the control logic 58 and the address memory 54.

Attention is now directed to FIG. 4 which depicts a schematic representation of the control logic 58 of FIG. 2 and which relates the assigned letters A–H from FIG. 2 to the various input/output pins of FIG. 4.

Figure 4A:
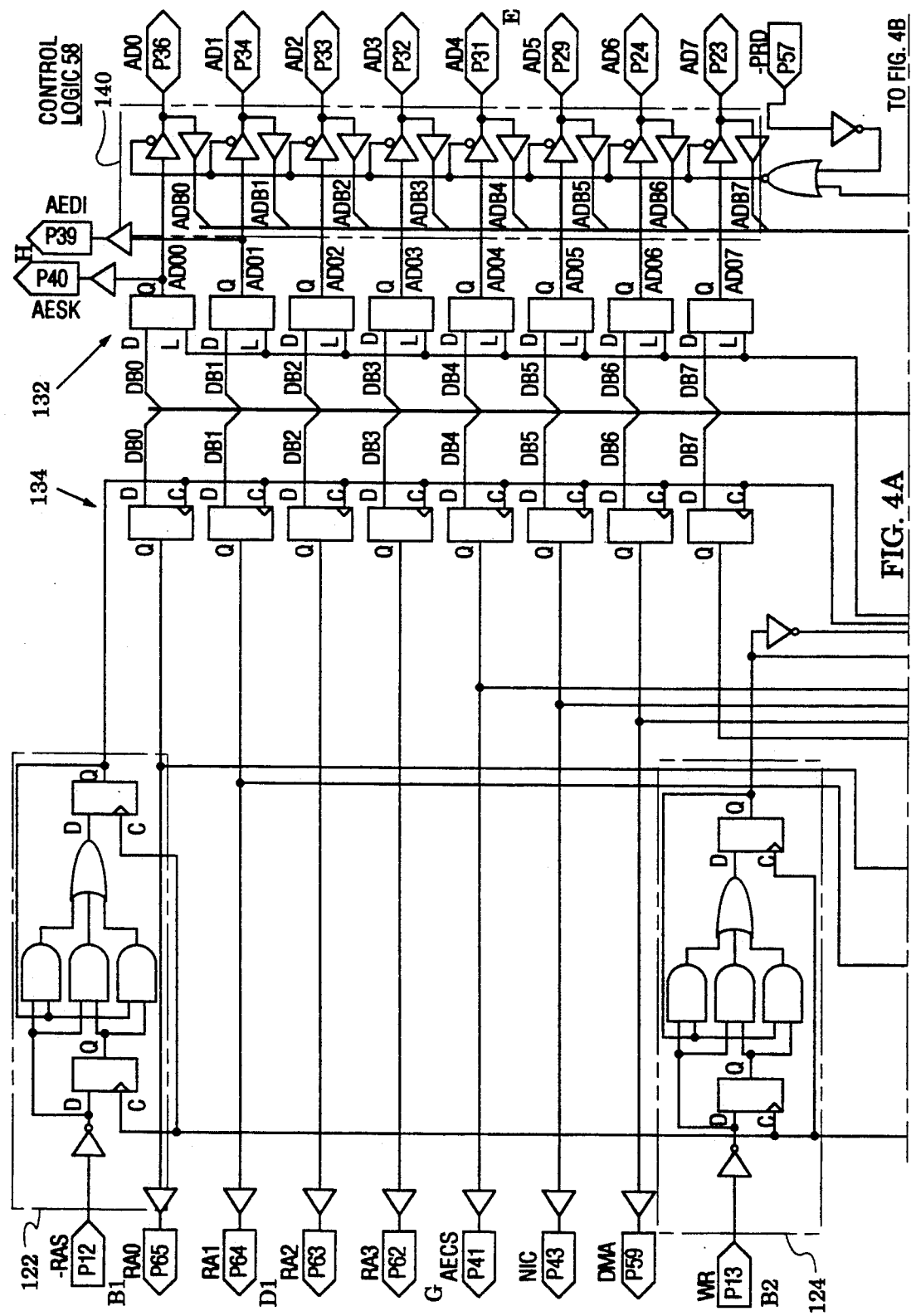
FIG. 4 is a schematic block diagram (partitioned for convenience into FIGS. 4A, 4B, 4C) of the control logic block of FIG. 2.
Figure 4C:
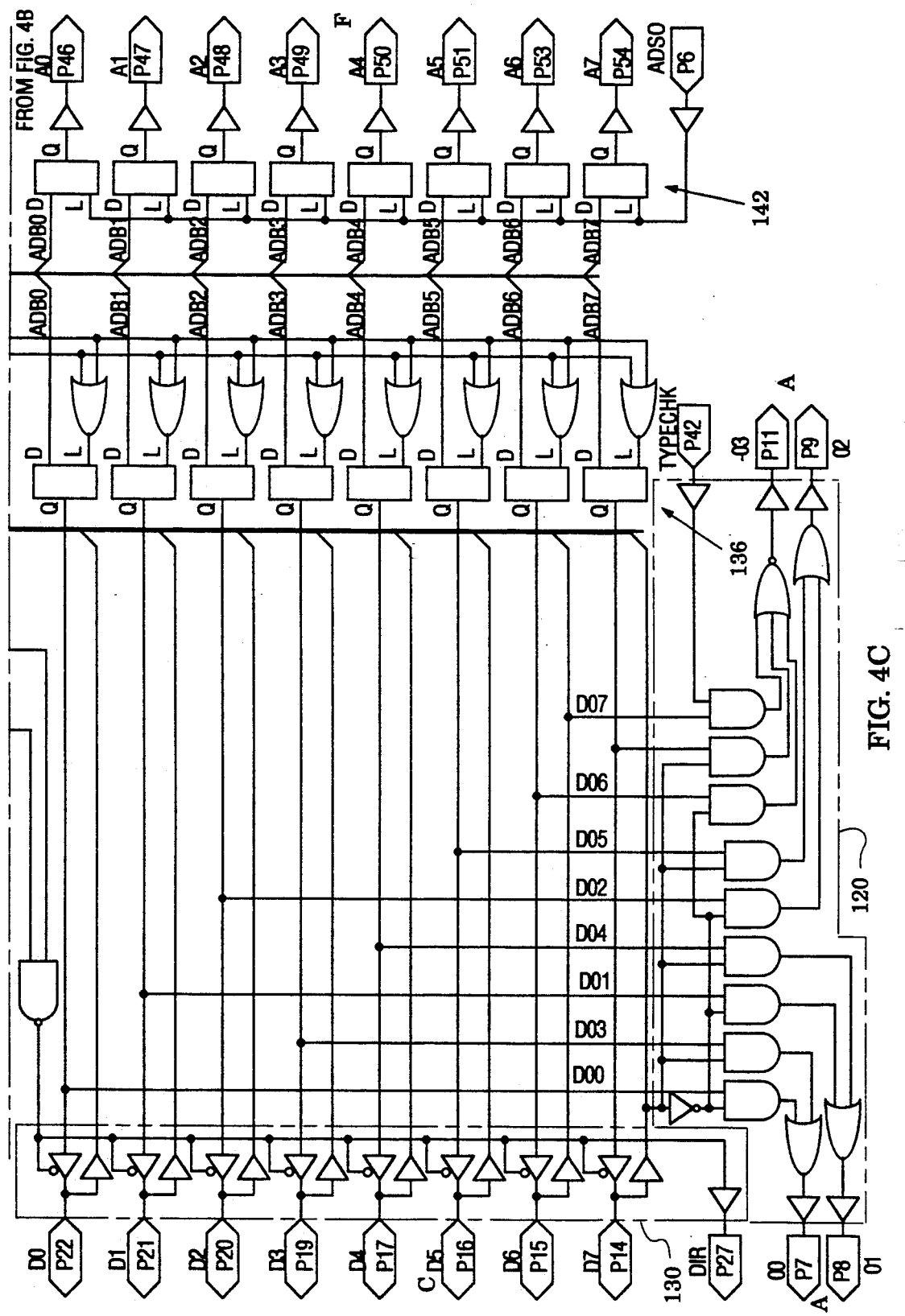

The control logic 58 of FIG. 4 is comprised of several readily identifiable functional circuit groups. Note specifically the gate configuration enclosed within dashed box 120 (FIG. 4C), functionally comprising a multiplexer for transferring four bits at a time, during the performance of the double quasi nibble transfer mode, to the line set A. Functional circuits 122, 124 (FIG. 4A)

and 126 (FIG. 4B) comprise digital debounce circuits which have as their inputs lines, the control line set B shown in FIG. 2. More specifically, debounce circuit 122 has as its input control signal, line B1 comprising the register address strobe. Debounce circuits 124 and 126 respectively accept as their inputs, the read/write signal and the register data strobe signal. The function of the debounce circuits 122, 124, and 126 is to remove short term spikes, e.g. less than 500 nanoseconds, from the input control signals. This feature is useful because, together with the hysteresis of the buffers 54, 56, it shapes the signal transitions from the parallel port to remove spurious perturbations. Typically, the falling or leading level or edge transitions of a signal from the parallel port has a relatively long duration of five microseconds or more. This creates the opportunity for a number of perturbations or bounces on the line, some of which are removed by the hysteresis of the buffers 54, 56. The debounce circuits 122, 124, 126 specifically remove short duration spikes, e.g. less than 500 nanoseconds, by sampling the signals from the buffers at a high clock rate, and then comparing each new sample with N immediately preceding samples. Only if the state of N successive samples are in agreement will the state be accepted for further processing by the control logic 58.

The functional circuit 128 comprises an edge detect and strobe generation circuit for processing the output of digital debounce circuit 126. Functional circuit 130 comprises a bidirectional buffer for handling eight bit data transfer in each direction. The bidirectional buffer 130 internally supplies its output to an eight bit latch circuit 132 and also an eight bit register 134. The bidirectional buffer 130 accepts its input from an eight bit latch 136. The bidirectional buffer 130 externally interfaces outside with the line set C as indicated in FIGS. 2 and 4.

A second bidirectional buffer 140 is shown in FIG. 4 and this functional circuit interfaces externally with data lines E keyed in FIGS. 2 an 4. Internal to the control logic 58, the bidirectional buffer 140 supplies input to the aforementioned eight bit latch 136 (FIG. 4C) as well as eight bit latch 142 (FIG. 4C). Note that the eight bit latch 142 interfaces with line set F keyed in FIGS. 2 and 4.

The final major functional circuit in FIG. 4 comprises control signal decode logic 146 (FIG. 4B) which outputs control signals D (represented in FIG. 4B as D2) to the network controller 46 (FIG. 2). Incidentally, the eight bit register 134 (FIG. 4A) also supplies an output signal (shown as D1) to the network controller 46. Input to the control decode logic 146 (FIG. 4B) is derived from the debounce circuit 124 (FIG. 4A) as well as the edge detect and strobe generation circuit 128 (FIG. 4B) and eight bit register 134 (FIG. 4A).

Figure 5:
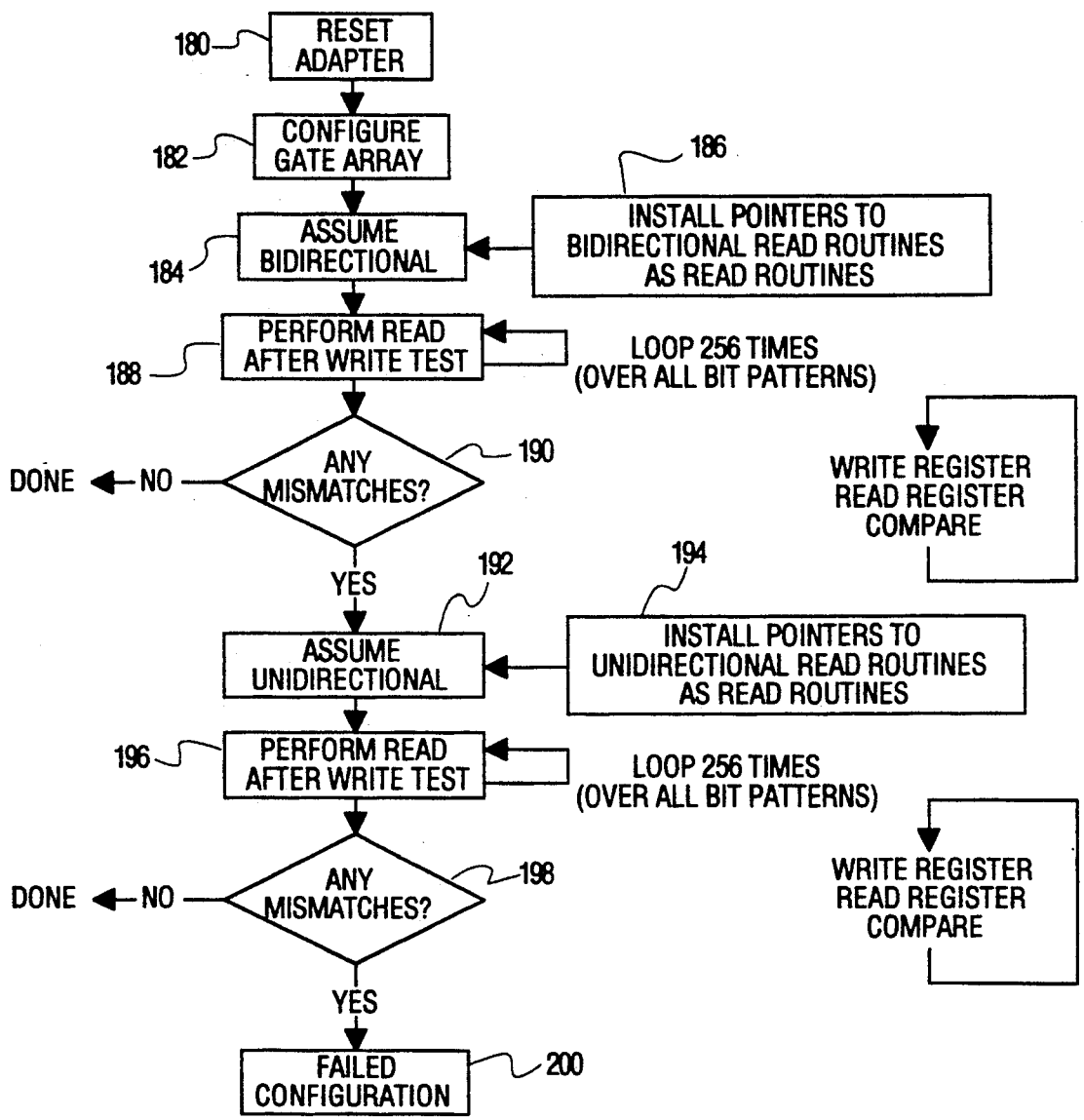
FIG. 5 is a flow chart depicting the initialization routine executed by the network adapter.

It has previously been mentioned that the control logic 58 can be implemented either as an application specific integrated circuit or as a programmable gate array. When implemented as a programmable gate array, an initialization routine (FIG. 5) must first be executed to download an encoded bitstream which defines the actual logic or schematic depicted in FIG. 4. FIG. 5 comprises a functional flow chart describing the initialization routine executed each time the adapter 10 is booted up, i.e. reset. More specifically, block 180 in FIG. 5 represents the initial step of the initialization routine, e.g. resetting of adapter 10. Thereafter, the PC configures the gate array (182) to define the control logic schematic as depicted in FIG. 4. This step involves downloading the adapter 10 with an encoded bitstream, typically about 12,000 bits long, which serially toggles the gate array. The aforementioned register data strobe and address strobe lines, B1 (FIG. 4A) and B3 (FIG. 4B) are used as the clock and data lines for toggling the logic into the gate array. After the gate array has been configured, these lines serve their primary purpose for address and data strobing.

After gate array configuration, the PC 30 tests the PC parallel port to determine whether it is bidirectional (e.g. AT or PS/2) (FIG. 3B, 3C) or unidirectional (XT) (FIG. 3A). Block 184 of FIG. 5 indicates that the parallel port is initially assumed to be bidirectional and therefore pointers to the bidirectional read routines as represented by block 186, are installed. Thereafter, as depicted by block 188, a read after write test is performed to successively write 256 different eight bit patterns to the adapter. Each data byte is read immediately after it is written. More specifically, the PC 30 writes a data byte to the adapter control logic 58 which will be latched in both data latches 132 and 134 (FIG. 4A). During the execution of the read after write test 188, after each data byte is written, it will be read back out of the adapter control logic 58 and compared to determine whether or not the read/write operation was successful. After the completion of the 256 write/read/compare operations, decision block 190 determines whether all operations were successful. If there were no mismatches, then the test 188 has established the bidirectionality of the parallel port. On the other hand, if any mismatches occurred during the 256 write/read/compare loops, then the operation depicted in FIG. 5 proceeds to block 192.

In step 192, instead of assuming the bidirectionality of the parallel port, unidirectionality is assumed and appropriate pointers are installed to the unidirectional read routines (step 194). Thereafter, the unidirectionability is tested by performing 256 write/read/compare loops in step 196. The test performed in 196 utilizing the unidirectional read routines (194) is essentially the same as the bidirectional test performed in step 188. More specifically, all 256 eight bit patterns are written to the control logic 58 via the buffer 130 and into the latches 132 and 134. The decision block 198 determines whether any mismatches occur in the write/read/compare tests. If none occur, then further operation continues using the unidirectional read routines. If, on the other hand decision block 198 depicts any mismatches, then the user is alerted to the fact that a failed configuration condition exists (step 200). A failed configuration can occur due, for example, to noise or other problems with the data path. At the end of the initialization procedure depicted in FIG. 5, the adapter will be in one of three states; it will either be configured to function with a bidirectional parallel port, a unidirectional parallel port, or will indicate a failed configuration.

After the adapter has been configured by the initialization sequence represented in FIG. 5, in its bidirectional mode it can operate similarly to any prior art network adapter. In fact, except for details in getting in and out of the control registers within the network controller 46 and moving data back and forth into the packet memory 52, existing software device drivers which are commercially available to function, for example, with Novell or 3-Com network operating systems can be used. That is, a software device driver written for a network operating system such as Novell or 3-Com, is structurally the same as one required to run the network adapter 10 disclosed herein. However, for specific embodiments of the present invention, low level differences in the software may be required for reading and writing to particular registers and moving data back and forth between the PC 30 and the adapter 10. In order to accommodate these differences, aforementioned Pocket LAN Adapters marketed by Xircom utilize a set of low level routines to perform these particular functions when porting an existing network operating system driver, as Novell or 3-Com, to a Xircom adapter 10. Very simply, this may involve replacing register access portions of existing software code with calls to these low level routines. The coding for these low level routines is disclosed in applications for copyright registration filed by Xircom on or about Mar. 10, 1990 entitled "Pocket Ethernet Driver" and "Users Manual For The Xircom Driver Development Kit".

Figure 6:
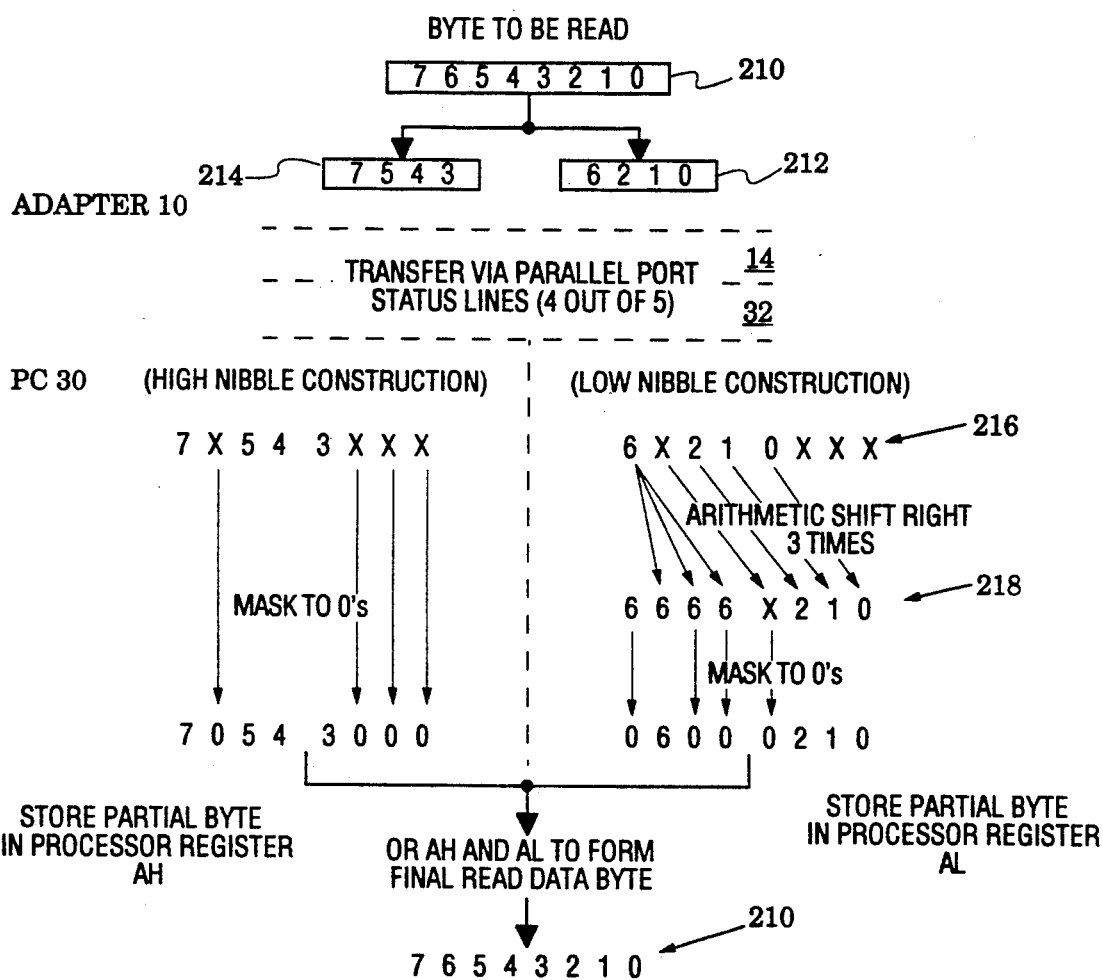
FIG. 6 is a chart functionally depicting the operation of the double quasi nibble transfer operation.

Attention is now directed to FIG. 6 which illustrates the operation of the double quasi nibble transfer mode which, as will be recalled, is utilized when the adapter 10 is configured to operate with an XT or unidirectional type parallel port, as depicted in FIG. 3A. The upper portion of FIG. 6 shows an eight bit data byte 210 to be read from the adapter 10 by the PC 30 across the adapter connector 14 and PC parallel port connector 32. The adapter splits the byte 210 into a quasi low nibble 212 containing original bits 0, 1, 2, 6) and a quasi high nibble 214 (containing bits 3, 4, 5 and 7). The quasi nibbles 212 and 214 are separately transferred across four of the parallel port status lines (78, FIG. 3A) four bits at a time. Within the PC 30, the high nibble and low nibble portions are then combined to ultimately recreate the original byte 210. This processing of the two quasi nibbles is depicted in FIG. 6.

In a PC XT parallel port configuration, the status lines when read out of the PC parallel port status register, correspond to bit positions 7, 6, 5, 4, 3 of an eight bit word. Unfortunately, bit position 6 of the status register is used as the interrupt line and cannot be used for transferring data. Therefore, the data coming into the four status lines of the PC's parallel port will appear in the status register in bit positions 7, 5, 4, 3. The double quasi nibble transfer mode employed in accordance with the invention and depicted in FIG. 6 manipulates the two quasi nibbles (high and low) around this limitation to correctly assemble a data byte. That is, note in FIG. 6 that the bits 7, 5, 4, 3 of high nibble 214 are read on to the four status lines and are stored as a partial byte in PC processor register AH. Bit position 6, 2, 1, 0 of the status register are masked to 0. The low nibble 212 which consists of bits 6, 2, 1, 0 are applied to the same four status lines but must be operated upon to move these bits into the right positions for combining with the stored partial byte in aforementioned register AH. Note in FIG. 6 that the low nibble bits 6, 2, 1, 0 are respectively brought in to the status register in positions 7, 5, 4, 3 (216) and then arithmetically shifted right three times to produce the eight bit group 218. Then, by masking to 0 positions 7, 5, 4, 3, the bits 6, 2, 1, 0 are moved into their proper position and can be stored as a partial byte in processor register AL. Then, by logically ORing registers AH and AL, the original byte 210 is reassembled. Note that in order to produce the eight bit group 218 from the eight bit group 216 (FIG. 6), an arithmetic shift right is performed. As is well known, an arithmetic shift right replicates the high order bit (in this case bit 6).

From the foregoing, it should now be clear that a network adapter has been disclosed herein particularly configured for connection to a PC parallel port to connect the PC to a network media. An adapter in accordance with the invention is characterized by a substantially enclosed rectangular housing having an external connector at one end for connection to a parallel port and a network media connector at an opposite end. In the operation of the adapter, the parallel port is tested during an initialization procedure to determine whether it is capable of operating in a bidirectional data transfer mode or unidirectional data transfer mode. This characteristic of the parallel port determines how the adapter transfers data bytes to the PC via the parallel port. If the parallel port is only capable of operating in a unidirectional mode, then the adapter operates in a double quasi nibble transfer mode as depicted in FIG. 6 to sequentially transfer partial bytes to the PC.

Although a preferred embodiment of the invention has been disclosed herein, it will be readily recognized by those skilled in the art that modifications and equivalent alternative structures can be used, all of which are intended to be encompassed by the accompanying claims.

I claim:

1. A system for functionally connecting a personal computer to a local area network via the computer's standard PC parallel port comprised of an external 25 pin D-shell connector, eight data lines, no more than five control out-lines, and no more than five status in-lines, each such data line, control out-line, and status in-line being electrically connected to a different one of said D-shell connector pins, said system comprising:

a network adapter having first connector means connected to said D-shell connector and second connector means connected to said network;

network interface means in said adapter connected to said second connector means for transmitting data packets to and receiving data packet from said network;

input/output circuit means in said adapter connected between said first connector means and said network interface means, said input/output means including control logic means responsive to signals on said D-shell connector pins connected to said control out-lines for selectively (1) transferring data bytes from said network interface means to said D-shell connector pins connected to said data lines and said status in-lines and (2) transferring data bytes from said D-shell connector pins connected to said data lines to said network interface means;

software driver means executable by said computer for determining whether said parallel port is configured for bidirectional or unidirectional data transfer; and means for configuring said control logic means to transfer data bytes to said pins connected to said data lines when said parallel port is configured for bidirectional data transfer and to said status lines when said parallel port is configured for unidirectional data transfer.

2. The system of claim 1 wherein said input/output circuit means is selectively operable in either a full data byte transfer mode or a partial data byte transfer mode; and means for causing said input/output circuit means to operate in said full byte transfer mode when said parallel port is configured for bidirectional data byte transfer and in said partial byte transfer mode when said parallel port is configured for unidirectional data byte transfer.

3. The system of claim 2 wherein said input/output circuit means is operable in said partial byte transfer mode for sequentially supplying first and second data byte portions to said status in-lines.

4. The system of claim 3 wherein said input/output circuit means includes signal shaping means for smoothing level transitions of signal inputs from said parallel port.

5. The system of claim 4 wherein said signal shaping means includes buffer means for smoothing out perturbations in said signal level transitions.

6. The system of claim 5 wherein said single shaping means includes digital debouncing means for removing spikes in said signal level transitions having a duration less than 500 nanoseconds.

7. The system of claim 1 wherein said network adapter comprises:
a housing having said network interface means and input/output circuit means internally mounted therein; and wherein
said first connector means is externally mounted on said housing for removable connection to said parallel port external connector.

8. The system of claim 7 wherein said second connector means is externally mounted on said housing for removable connection to said network.

9. The system of claim 8 wherein said housing is dimensioned to be conveniently carried by a user having a length less than 8.0 inches, a width less than 3.5 inches and a height less than 2.0 inches.

10. The system of claim 3 wherein a full data byte to be transferred to said parallel port is comprised to eight bits respectively represented as 7,6,5,4,3,2,1,0; and wherein
said first data byte portion includes bits 7,5,4 and 3 and said second data byte portion includes bits 6,2,1, and 1.

11. The system of claim 10 further including said personal computer; and
means controlling said computer for reassembling said first and second data byte portions sequentially supplied to said status input lines for form a full data byte.

12. The system of claim 11 wherein said means controlling said computer includes means for transferring the four bits of each successive data byte portion into stages 7,5,4, and 3 of an eight bit register where the stages from most to least significant are numbered 7,6,5,4,3,2,1,0.

13. A network adapter configured to functionally connect a local area network cable to an internal bus of a personal computer (PC) via a standard PC parallel port comprised of an external 25 pin D-shell connector, eight data lines, no more than five control out-lines, and no more than five status in-lines, each such data line, control out-line, and status in-line being electrically connected to a different one of said D-shell connector pins, said adapter comprising:
a housing;
first connector means mounted externally on said housing configured for connecting to said D-shell connector;
second connector means mounted externally on said housing configured for connecting to said network cable;
network interface means mounted in said housing connected to said second connector means for transmitting data packets to and receiving data packets from said network cable; and
input/output means mounted in said housing connected between said first connector means and said network interface means, said input/output means including control logic means responsive to signals on said D-shell connector pins connected to said control out-lines for selectively (1) transferring data bytes from said network interface means to said D-shell connector pins connected to said status in-lines and (2) transferring data bytes from said D-shell connector pins connected to said data lines to said network interface means.

14. The network adapter of claim 13 wherein said control logic means is additionally responsive to signals on said D-shell connector pins connected to said control out-lines for selectively transferring data bytes from said network interface means to said D-shell connector pins connected to said data lines.

15. The network adapter of claim 14 wherein said control logic means is capable of being programmed by a PC via its parallel port to which the adapter is connected.

16. The network adapter of claim 13 wherein said housing is dimensioned to be conveniently carried by a user having a length less than 8.0 inches, a width less than 3.5 inches and a height less than 2.0 inches.

17. A method of communicating data between a personal computer having an internal bus and a standard PC parallel port, comprised of an external 25 pin D-shell connector, eight data lines, no more than five control out-lines, and no more than five status in-lines, each such data line, control out-line, and status in-line being electrically connected to a different one of said D-shell connector pins, and a network including a network medium, said method comprising:
connecting a transceiver to said network medium;
controlling said transceiver to transmit data packets from a data packet memory to said network medium and to receive data packets from said network medium for storage in said memory;
connecting input/output circuitry to said D-shell connector; and
controlling said input/output circuitry in response to signals on said D-shell connector pins connected to said control out-lines for selectively (1) transferring data bytes from said transceiver to said internal bus via said D-shell connector pins connected to said status in-lines and (2) transferring data bytes from said internal bus via said D-shell connector pins connected to said data lines to said transceiver.

18. The method of claim 17 wherein said step of connecting said input/output circuitry to said parallel port includes the step of detachably mating a multipin connector fixed to said input/output circuitry to said parallel port D-shell connector.

19. The method of claim 18 wherein said step of detachably mating includes the further step of threading at least one screw into a threaded hole mounted adjacent to said D-shell connector.

20. The method of claim 17 wherein said step of controlling said input/output circuitry includes a step of determining whether said parallel port is configured for bidirectional data transfer.

21. The method of claim 17 wherein said step of transferring data bytes to said computer internal bus via said status in-lines includes the substeps of sequentially transferring partial bytes.

22. The combination with network interface circuitry adapted to be connected to a local area network medium, wherein said network interface circuitry includes a memory for storing data received from and to be transmitted to said network medium, input/output circuitry for connecting a personal computer (PC) having an internal bus and a standard PC parallel port to said network interface circuitry, said parallel port being comprised of an external 25 pin D-shell connector, eight data lines, no more than five control out-lines, and no more than five status in-lines, each such data line, control out-line, and status in-line being electrically connected to a different one of said D-shell connector pins, said input/output circuitry including:

a multipin connector fixed to said input/output circuitry;

means for detachably connecting said multipin connector to said D-shell connector; and control logic means for bidirectionally transferring data between said internal bus and said memory via said multipin connector and said parallel port D-shell connector, said control logic means being responsive to signals on said D-shell connector pins connected to said control out-lines for selectively (1) transferring data bytes from said network interface means to said D-shell connector pins connected to said data lines and said status in-lines and (2) transferring data bytes from said D-shell connector pins connected to said data lines to said network interface means.

23. The combination of claim 22 including captive screw means mounted on said housing for threaded engagement with screw holes adjacent to said D-shell connector.

24. The combination of claim 22 wherein said parallel port defines unidirectional data out-lines and unidirectional status in-lines; and wherein said control logic means transfers data from said internal bus to said memory via said data out-lines and from said memory to said internal bus via status in-lines.

25. The combination of claim 22 wherein said network interface circuitry is configured to implement the IEEE 802 standard.

26. Apparatus for transmitting data to and receiving data from a local area network and for bidirectionally transferring such data to a computer's internal bus via the computer's standard parallel port comprised of an external 25 pin D-shell connector, eight data lines, no more than five control out-lines, and no more than five status in-lines, each such data line, control out-line, and status in-line being electrically connected to a different one of said D-shell connector pins, said apparatus including:

a housing;

network interface circuitry mounted in said housing including a data packet memory and transceiver means for transmitting data from said memory to said network and for receiving data from said network for storage in said memory;

a multipin connector externally mounted on said housing configured for detachable connection to said parallel port connector; and input/output circuitry mounted in said housing including control logic means for bidirectionally transferring data bytes between said memory and said internal bus via said external multipin connector and said parallel port connector, said control logic means being responsive to signals on said D-shell connector pins connected to said control out-lines for selectively (1) transferring data bytes from said network interface means to said internal bus via said D-shell connector pins connected to said status in-lines and (2) transferring data bytes from said internal bus via said D-shell connector pins connected to said data lines to said network interface circuitry.

27. The apparatus of claim 26 wherein said D-shell connector has threaded holes located proximate thereto; and wherein said external multipin connector is configured for detachable mating to said D-shell connector; and wherein at least one screw is mounted on said housing and configured for threaded coupling into one of said threaded holes to secure said connectors in mating relationship.

28. The apparatus of claim 26 wherein said control logic means includes a gate array capable of being programmed in response to information supplied thereto from said computer internal bus via said parallel port connector.

29. The apparatus of claim 26 wherein said control logic means transfers data from said internal bus to said memory via a first set of connecting pins in said external multipin connector and said parallel port connector and from said memory to said bus via a second set of connecting pins in said connectors.

30. The apparatus of claim 26 wherein said network interface circuitry is configured to implement the IEEE 802 standard.

* * * * *